H. A. DENMIRE.
COLLAPSIBLE TIRE CORE.
APPLICATION FILED DEC. 9, 1920.

1,421,418.

Patented July 4, 1922.

2 SHEETS—SHEET 1.

Inventor
Harold A. Denmire
by Thurston Kwis & Hudson
Attorneys

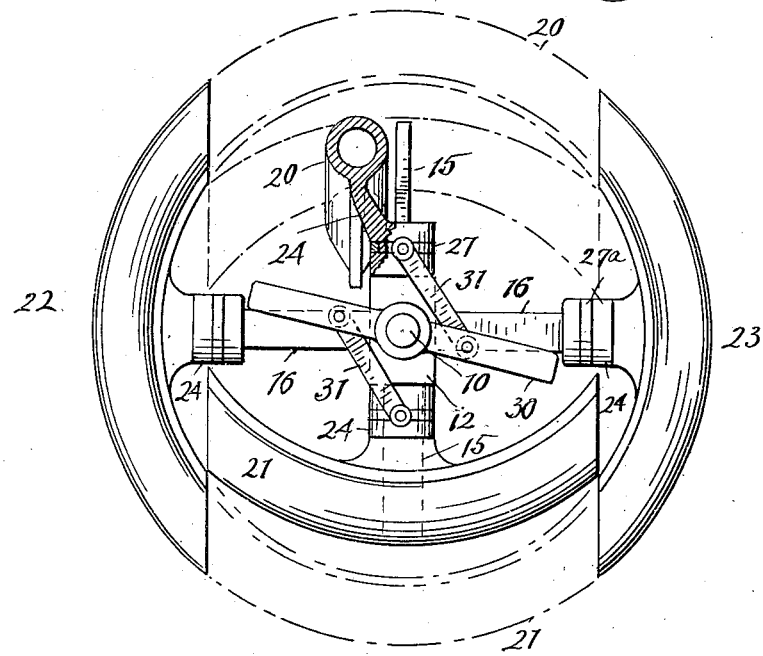
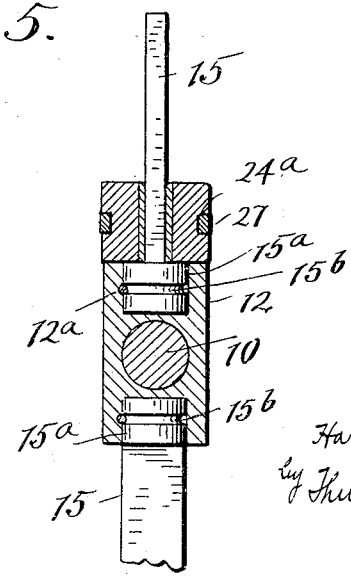

UNITED STATES PATENT OFFICE.

HAROLD A. DENMIRE, OF AKRON, OHIO, ASSIGNOR OF ONE-HALF TO THE GENERAL TIRE AND RUBBER COMPANY, OF AKRON, OHIO, A CORPORATION OF OHIO.

COLLAPSIBLE TIRE CORE.

1,421,418.      Specification of Letters Patent.      Patented July 4, 1922.

Application filed December 9, 1920. Serial No. 429,340.

*To all whom it may concern:*

Be it known that I, HAROLD A. DENMIRE, a citizen of the United States, residing at Akron, in the county of Summit and State of Ohio, have invented a certain new and useful Improvement in Collapsible Tire Cores, of which the following is a full, clear, and exact description.

This invention relates to the kind of collapsible tire cores which, without being demounted from the tire stand on which a core must be rotatably supported, may be collapsed sufficiently to enable the removal of a finished tire casing therefrom, and again expanded for use in building up another tire casing thereon.

The invention comprises a core made up of radially movable arc-shaped sections adapted to be moved into circumferential alignment, and to then form a complete annulus, some of said sections being capable, after they have been moved inward from their expanded positions, of being turned about substantially radial axes whereby they assume positions in which they do not impede the retracting movements of the other sections.

All of which is shown in the accompanying drawings and will be hereinafter described and pointed out definitely in the appended claims.

Figure 1:
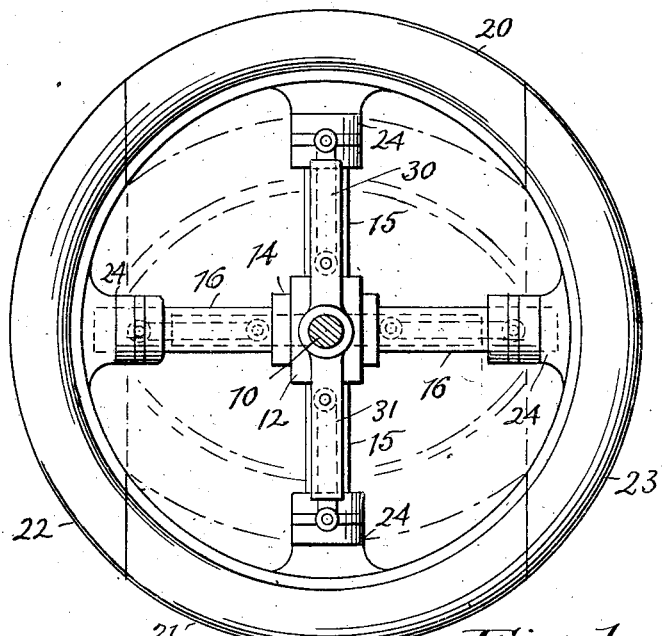
Figure 2:
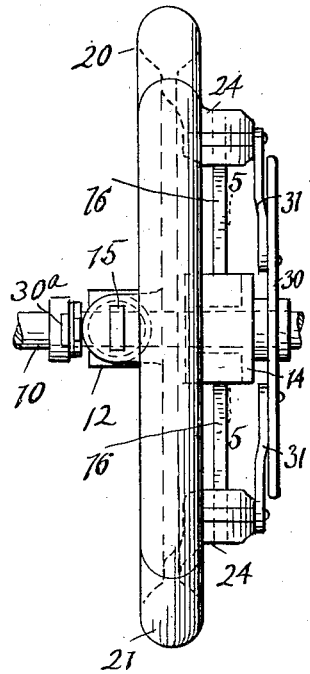
Figure 3:
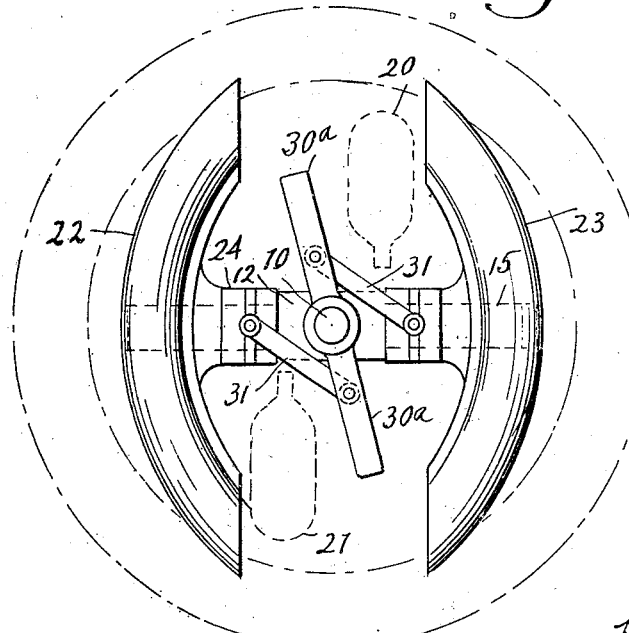

In the drawing, Fig. 1 is a side elevation of the core in its expanded condition, the view being from the right side of Fig. 2, which is an edge view of the core in the condition shown in Fig. 1; Fig. 3 is a side elevation of the core in its collapsed condition when viewed from the left side of Fig. 2; Fig. 4 is a side elevation from the right side of Fig. 2, showing the relation of the parts when the key cores have been retracted, and when one of them (shown in section) has been turned out of the way of the other radially movable core sections; Fig. 5 is a sectional view in the plane of line 5—5 on Fig. 2, showing the rotatable radial guides for the key cores.

Referring to the parts by reference characters, 10 represents the shaft which, when this invention is ready for use, must be rotatably supported from one end only in a tire stand so-called in the usual or any suitable manner.

To this shaft two collars 12 and 14 are fixed side by side, each of which carries two radially disposed and diametrically opposed guide bars. The guide bars are preferably of rectangular cross section, the guide bars 15 being carried by collar 12, and being at right angles to the guide bars 16 carried by the collar 14.

The core is made up of two key sections 20, 21, and two other sections 22, 23. Each section is provided with an offset lug 24 secured to it midway between its ends, and extended from the core toward the axis of the shaft, and this lug embraces and is slidable upon the associated guide bar. The two key sections are slidable upon guide bars 15 while the other two sections are slidable upon the guide bar 16.

An operating lever 30 rotatably mounted upon shaft 10; and upon opposite sides of the shaft it is connected by links 31 with the two key sections 20, 21, respectively.

By turning this operating lever upon the shaft these key sections will be moved inward upon their guides toward the axis of the shaft or away from the shaft into circumferential alignment with the other two sections when they are in their expanded positions. The ends of the core sections must be so shaped as to permit the key sections to move to their expanded positions between the two other sections and to form with them a complete annulus.

The two core sections 22, 23, are slidably mounted upon the guide bars 16, and they may be moved out and in upon said guide bars by means similar to the means provided for moving the two key sections. That is to say, there may be a lever $30^a$ rotatably mounted on shaft 10, and this lever on opposite sides of the shaft may be connected by links 31 to two cores 22, 23, respectively. The particular means shown for moving the core sections radially upon their respective guide bars are suitable for the purpose, but are not, in the specific form shown, essential to the invention, for any other suitable means may be employed for this purpose.

The characteristic which distinguishes this invention from other constructions, is that the key sections may be turned about the radial axes along which they move toward and away from the shaft,—the purpose of such turning movements being to get them out of the way of the other core sections so that the latter may be moved to their collapsed positions.

To permit this turning movement I have shown each of the guide bars 15 with a cylindrical inner end 15ª which is rotatably mounted in the supporting collar 12 and is prevented from endwise movement by means of a circumferential groove 15ᵇ in the cylindrical end of the guide bar, and a pin 12ª driven into collar 12 so as to project into said groove. The offset lug 24 which is secured to each of the core sections and which is the part of the core section which slides on the associated guide bar, is formed with an annular groove 24ª; and a collar 27 is rotatably mounted in said groove the outer end of each link 31 is pivotally connected with this collar instead of to the lug direct. The parts are intended to operate as follows:

When a tire casing has been built up on the expanded core the operator taking hold of the lever 30 turns it and thereby draws both of the key sections 20, 21, radially toward the shaft and out of the tire casing. Then the operator taking hold of these core sections turns each of them 90° substantially as shown in the upper part of Fig. 4. as indicated in Fig. 3, so that they no longer are in the path of the core sections 22, 23. which sections are then moved radially inward by the turning of the other lever 30ª. The core sections 22, 23, are by this movement substantially withdrawn from the finished tire casing. At any rate, they are withdrawn far enough to permit the tire casing to be removed. It is not thought necessary, and perhaps it is not desirable to associate with the core sections 22, 23, any means by which they may be turned. In the construction shown, however, in the drawing, the lug 24 on each which is slidably mounted upon the associated guides 16. has a collar 27ª rotatably mounted upon it, and links 31ª at their outer end are connected with this collar.

Likewise, these guide bars 16 are rotatably mounted in the collar 14 by which they are supported. In other words, as the construction is shown in the drawings, these key sections 22, 23, are associated with the same means as those associated with the other key sections so that they may be turned about the radial axis along which they move toward and from the shaft. As before stated, however, it is not thought that it is necessary to turn the core sections 22, 23, in order to permit the removal of the finished tire casing.

Having described my invention, I claim:—

1. A collapsible core made up of a plurality of arc-shaped sections which when circumferentially aligned form a complete annulus, two of said sections being diametrically opposed key sections which are capable of being moved radially into and away from the positions in which they are circumferentially aligned with the other core sections, guides upon which said key sections are movable, means for moving said key sections along said guides, said construction being characterized by that the two key sections are capable of being turned about the radial axis along which they move toward and from said shaft.

2. In collapsible core construction, the combination of a shaft, four equally spaced radial guide bars on said shaft, four core sections having offset lugs which are respectively mounted to slide on said guide bars between the expanded and collapsed positions. the ends of two of the said core sections being shaped to permit two opposed core sections to pass between the other two core sections when the latter are in their expanded positions and thereby produce a complete annulus,—and a collar fixed to said shaft,—the two diametrically opposed guide bars on which said key core sections are slidably mounted being themselves rotatably supported by said collar.

3. In collapsible core construction, the combination of a shaft, four equally spaced radial guide bars on said shaft, four core sections having offset lugs which are respectively mounted to slide on said guide bars between the expanded and collapsed positions, the ends of two of the said core sections being shaped to permit two opposed core sections to pass between the other two core sections when the latter are in their expanded positions and thereby produce a complete annulus, and a collar fixed to said shaft. the two diametrically opposed guide bars on which said key core sections are slidably mounted being themselves rotatably supported by said collar, a lever rotatably mounted upon the shaft, links connecting said lever with the two key core sections respectively, another lever rotatably mounted on the shaft, links connecting it with the two other core sections respectively, the two key core sections being provided with collars which are rotatable thereon and to which the links associated with said core sections are pivotally connected.

In testimony whereof, I hereunto affix my signature.

HAROLD A. DENMIRE.